United States Patent
Ryu et al.

(10) Patent No.: US 6,222,670 B1
(45) Date of Patent: Apr. 24, 2001

(54) LONG-BAND OPTICAL FIBER AMPLIFIER WITH ENHANCED POWER CONVERSION EFFICIENCY

(75) Inventors: Uh-Chan Ryu; Nam-Kyoo Park, both of Seoul; Ju-Han Lee, Suwon, all of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/382,246

(22) Filed: Aug. 25, 1999

(51) Int. Cl.[7] ........................................................ H01S 3/30
(52) U.S. Cl. .............................. 359/345; 359/337; 359/341
(58) Field of Search ...................................... 359/134, 160, 359/337, 341, 345; 372/6, 70

(56) References Cited

U.S. PATENT DOCUMENTS 5,406,411 * 4/1995 Button et al. ......................... 359/341
5,430,572 * 7/1995 DiGiovanni et al. ................. 359/337
5,991,069 * 11/1999 Jander .................................. 359/337

\* cited by examiner

*Primary Examiner*—Thomas H. Tarcza
*Assistant Examiner*—Deandra M. Hughes
(74) *Attorney, Agent, or Firm*—Steve Cha; Klauber & Jackson

(57) ABSTRACT

A long-band optical fiber amplifier with enhanced power conversion efficiency including a first optical fiber part provided with a pumping light source, a second optical fiber part connected with the first optical fiber part, the second optical fiber part being not provided with the pumping light source, and a reuse circuit coupled between the first optical fiber part and the second optical fiber part for utilizing amplified spontaneous emission (ASE) as a secondary pumping light source from the first optical fiber part. Preferably, the reuse circuit comprises a WDM coupler connected between the first and second optical fiber parts, and a light pumping device connected with the WDM coupler to provide the pumping light source. The first and second optical fiber parts consist of erbium-doped optical fiber, and the erbium-doped optical fiber is adjusted so as to produce a gain in the L-band.

9 Claims, 6 Drawing Sheets

US 6,222,670 B1

LONG-BAND OPTICAL FIBER AMPLIFIER WITH ENHANCED POWER CONVERSION EFFICIENCY

CLAIM OF PRIORITY

This application makes reference to, incorporates the same herein, and claims all benefits accruing under 35 U.S.C. § 119 arising from an application entitled, LONG-BAND OPTICAL FIBER AMPLIFIER WITH ENHANCED POWER CONVERSION EFFICIENCY, earlier filed in the Korean Industrial Property Office on Aug. 25, 1998, and there duly assigned Ser. No. 1998-34370.

BACKGROUND OF THE INVENTION

1. Field of the Invention

The present invention relates to an optical fiber amplifier, and more particularly, a long-band (1570 nm~1610 nm) optical fiber amplifier for providing enhanced power conversion efficiency by utilizing amplified spontaneous emission as a secondary pumping light source.

2. Description of the Related Art

In the past, erbium-doped fiber amplifiers were developed to amplify a single wavelength near the 1550-nm loss minimum of silica fibers. Then, with the advent of wavelength-division multiplexing, multiple wavelengths in that band can be amplified. In wavelength division multiplexed (WDM) optical communications system, one of important technological requirement is to provide an erbium-doped fiber amplifier (EDFA) with a flattened gain in a broad band since the multiwavelength operation adds some complications to the use of fiber amplifier.

In order to amplify the various wavelengths equally, some consideration has been given for obtaining an optical fiber amplifier to extend in the wide-band that the conventional EDFA cannot provide for. One of the methods for achieving the wide-band optical fiber amplifier is to use a new material for the optical fiber, such as the tellurite based optical fiber. Although tellurite based optical fiber amplifier has suitable properties to meet the requirements to be used as wide-band optical fiber amplifier, the relevant technologies have not been fully developed, and it has some undesirable characteristic, such as irregular gain spectrum.

Besides adopting such new materials, other efforts have been concentrated to achieve a gain in a band beyond the conventional amplified band (1530 nm–1560 nm; hereinafter referred to as "C-band"), by employing various designs of silica based EDFAs. In addition, there has been some proposed materials and structure to induce about 30 to 40% population inversion of the erbium atoms in the EDF to span the wavelengths from 1570 nm~1610 nm (hereinafter referred to as "L-band"). Using complex techniques, developers can run such C-band and L-band amplifiers in parallel so as to make the silica based EDFA having a wide gain band over 80 nm for the WDM transmission system. However, in order to develop such high capacity amplifier, the L-band fiber amplifier requires much longer length of EDFs and more powerful power pumps, which results in less power conversion efficiency in the fiber.

One significant concern with L-band fiber amplifiers is their power conversion efficiency. Also, of concern is the noise figure of the fiber amplifier. Thus, the present invention provides an optical power amplifier with improved power conversion efficiency, small-signal gain, and noise figure.

SUMMARY OF THE INVENTION

It is an object of the present invention to provide an optical fiber amplifier operating in a L-band range with enhanced power conversion efficiency and/or with optimized noise figure.

According to the present invention, a long-band optical fiber amplifier includes a first optical fiber part provided with a pumping light source, a second optical fiber part operatively coupled to the first optical fiber part, the second optical fiber part not provided with a pumping light source, and a reuse circuit coupled between the first optical fiber part and the second optical fiber part for utilizing the amplified spontaneous emission (ASE) generated from the first optical fiber part as a secondary pumping light source. Preferably, the reuse circuit comprises a WDM coupler disposed between the first optical fiber part and the second optical fiber part, and a light pumping device coupled to the WDM coupler therebetween to provide the pumping light source. The first and the second optical fiber parts consist of erbium-doped optical fiber, and these erbium-doped optical fibers provides an amplification gain in the higher wavelengths (L-band).

Other objects and attainments together with a fuller understanding of the present invention will become apparent and appreciated by referring to the following description and claims taken in conjunction with the accompanying drawings.

DETAILED DESCRIPTION OF THE PREFERRED EMBODIMENT

Figure 1:
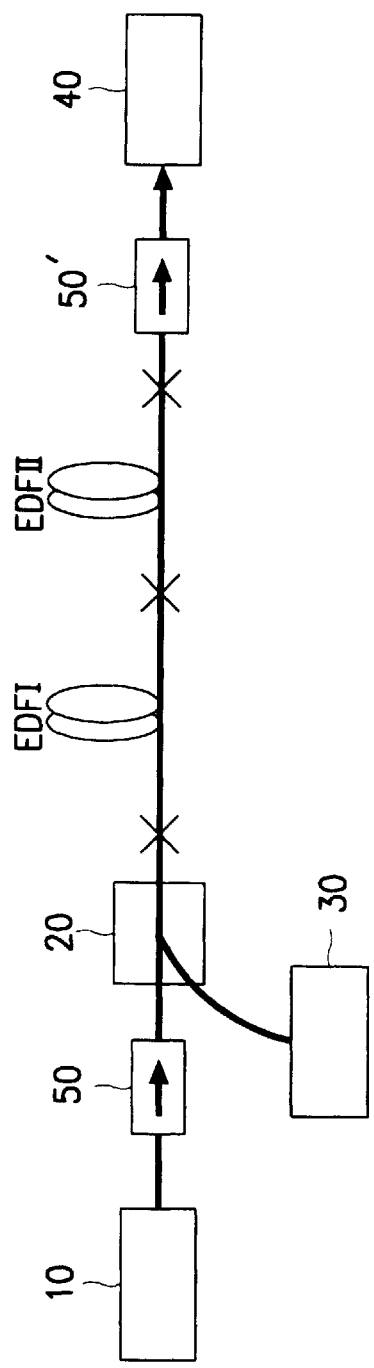
FIG. 1 is a block diagram for illustrating the structure of a conventional L-band silica based EDFA.
Figure 2:
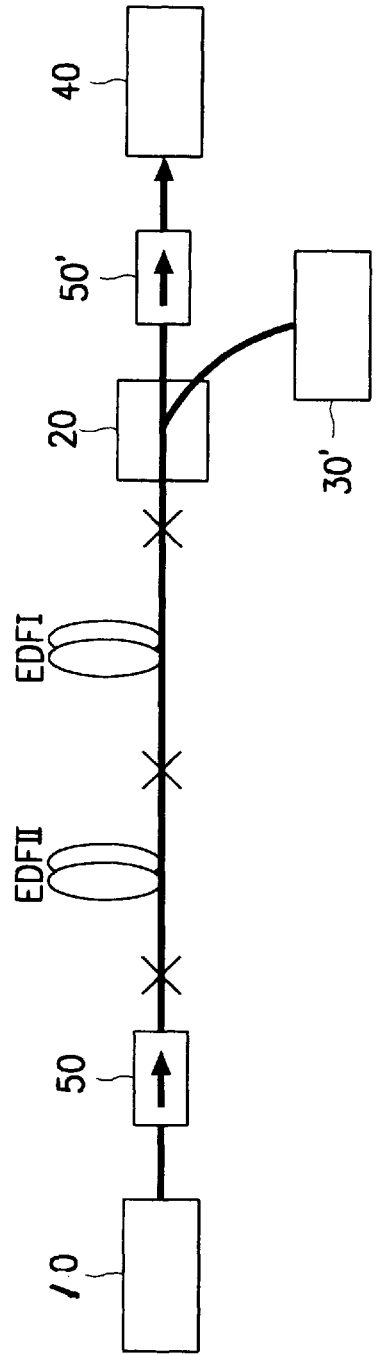
FIG. 2 is a block diagram for illustrating a structure of another conventional L-band silica based EDFA.

A conventional L-band silica based EDFA includes a front pumping structure as shown in FIG. 1 (hereinafter referred to as "first type EDFA"), or a back pumping structure as shown in FIG. 2 (hereinafter referred to as "second type EDFA").

In the first type EDFA, an input signal light 10 is amplified through the first EDF region (EDF I), being pumped by a front pumping device 30, and passes through the second EDF region (EDF II) as an amplified output signal light 40. The front pumping device 30 is operatively coupled to a wavelength division multiplexed (WDM) coupler 20 to couple the input signal with the pump wavelength. The first pump device 30 and the WDM coupler are coupled adjacent to the input end of the first type EDF than to its output end. A pair of optical isolators 50, 50' are respectively arranged at the input and output ends in order to guide the signal light in a single direction and to keep the scattered light from the output fiber from going back into the fiber amplifier.

In the second type EDFA, an input signal light 10 is amplified through the second EDF region (EDF II), passes through the first EDF region (EDF I) being pumped by a back pumping device 30', and finally generated as an output signal light 40. Similar to the front pumping structure, the back pumping device 30' is operatively coupled to the WDM coupler 20, and the back pumping device 30' and the WDM coupler 20 are coupled adjacent to the output end of the second type EDF than to its input end. A pair of optical isolators 50, 50' are respectively arranged at the input and output ends in order to guide the signal light in a single direction.

Figure 3:
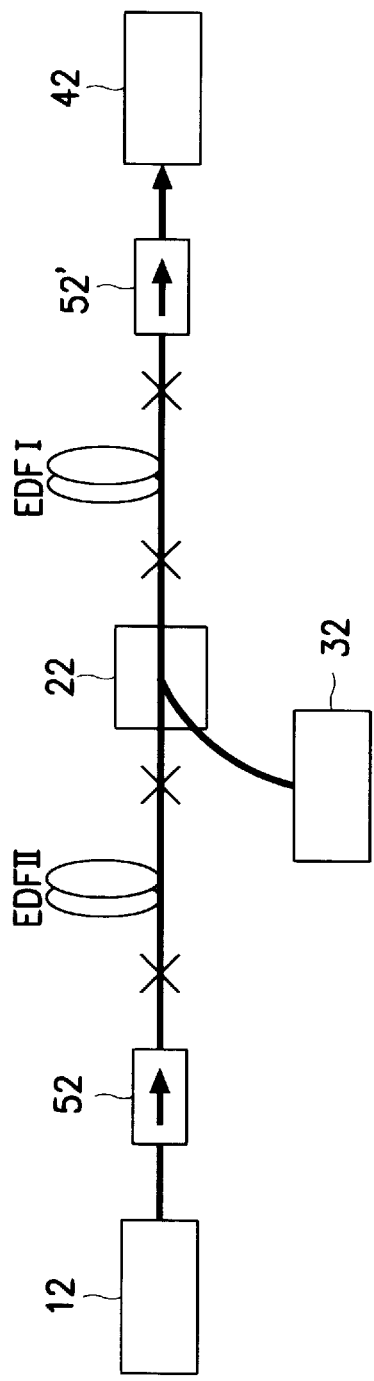
FIG. 3 is a block diagram for illustrating the structure of an L-band silica based EDFA according to a preferred embodiment of the present invention.
Figure 4:
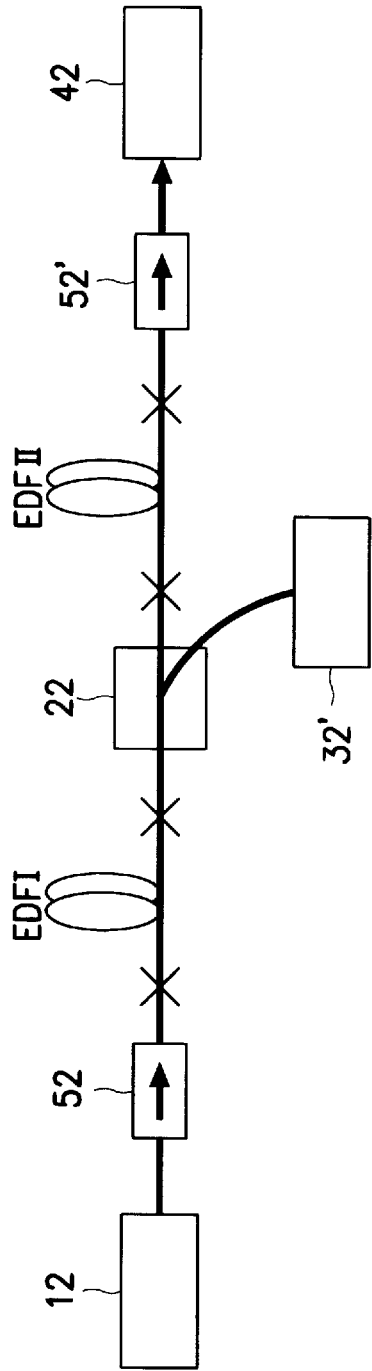
FIG. 4 is a view similar to FIG. 3 in according to another preferred embodiment of the present invention.

According to the preferred embodiments of the present invention, the inventive L-band silica based EDFA may be embodied in two types, one of which is to transmit an input signal light 12 through the input end of a second EDF II and to the input end of a first EDF I, which is being pumped by a front pumping device 32 coupled to the input end to EDF I, as shown n FIG. 3 (hereinafter referred to as "third type EDFA"). The second embodiment transmits an input signal light 12 through the first EDF I and being pumped by the back pumping device 32' coupled to the output end of EDF I, and then transmitted to the second EDF II, as shown in FIG. 4 (hereinafter referred to as "fourth type EDFA"). The present invention provides the front or the back pumping device operatively coupled between the first EDF region (EDF I) and the second EDF region(EDF II).

Further, both the third and the fourth type EDFAs include a front and back pumping devices 32 and 32' operatively connected to the WDM coupler 22, and a pair of optical isolators 52 and 52' are, respectively, arranged at the input and output ends in order to guide the signal light in a single direction.

In order to compare the inventive EDFA of the present invention with the conventional EDFA, commercially available Al-codoped optical fibers (EDFs) having the maximum absorption coefficient of 4.5 dB/m were used in the first through the fourth type EDFAs. In addition, the length of the first EDF I was set to be 135 m, and the length of the second EDF II was changed in sequence to be 0 m, 5 m, 15 m, 20 m, 25 m and 35 m for all four types of EDFAs for analyzing the small-signal gain varations dependent on the length of the second EDF II.

Also, for the comparison purpose of four different types of EDFAs, a commonly used pumping device having the pumping wavelength of 980 nm with an output of 90 mW was used.

The EDFA gain was evaluated by using a spectrometer along with a wavelength variable laser set with a central wavelength of 1590 nm. Two kinds of the input light signals with the intensities of −20 dBm and 0 dBm were used, in order to accurately measure the small signal gain, noise figure, saturated power intensity, and power conversion efficiency. The input signal was provided with low insertion loss to be less than 2 dB for all four different types of EDFAs.

Figure 5:
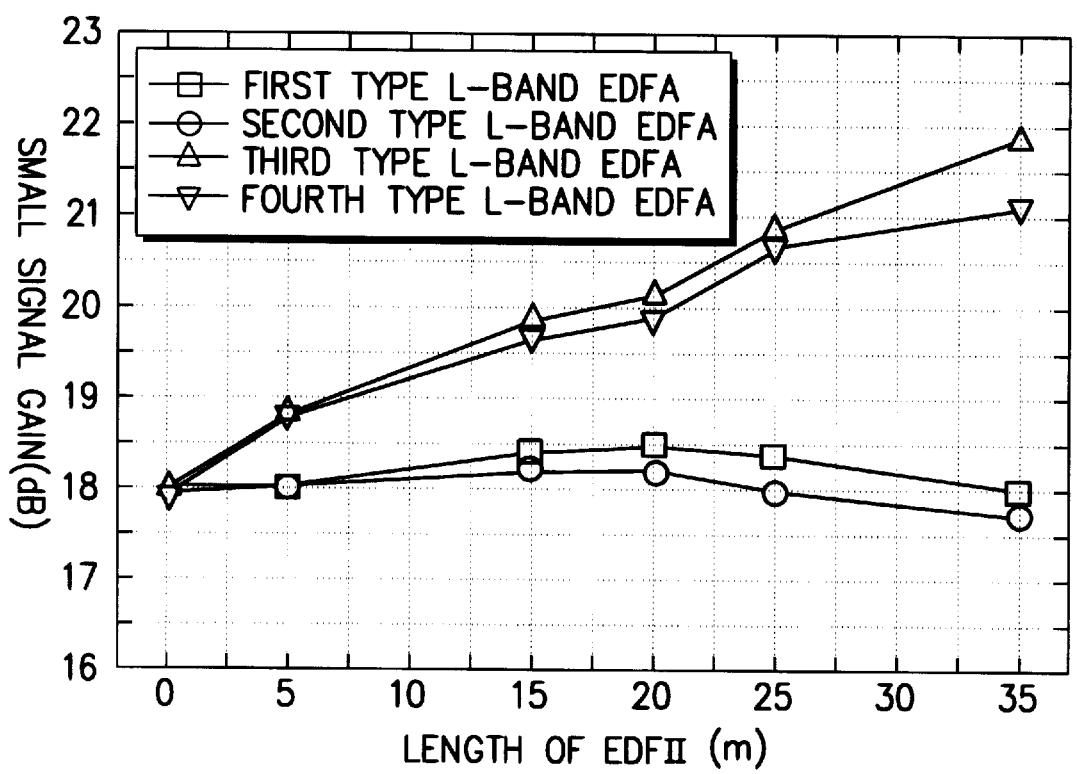
FIG. 5 illustrates the graphs showing a comparison of the small signal gains from the first through the fourth type of EDFAs with according to a variation in the length in the second EDF (EDF II)
Figure 6:
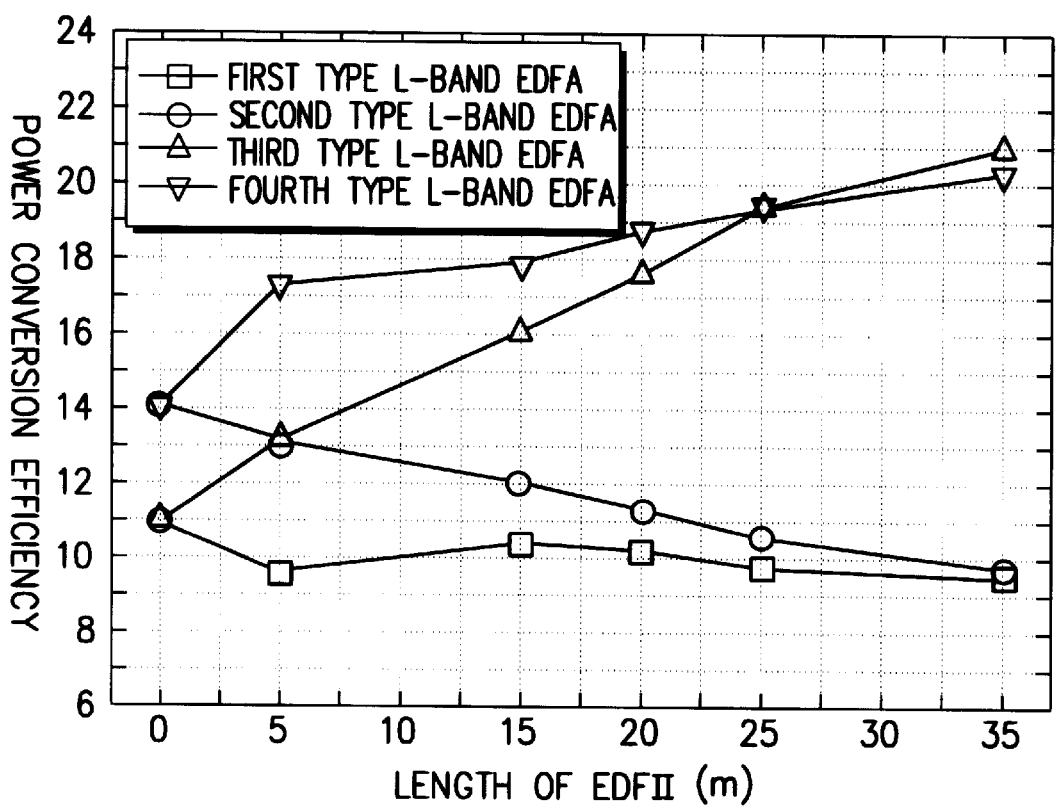
FIG. 6 illustrates the graphs comparing the power conversion efficiencies from the first through the fourth type of EDFs according to a variation of the length in the second EDF (EDF II)

As illustrated in FIG. 5, the inventive third and the fourth type EDFAs in accordance with the present invention exhibited improved small-signal gain that is highly depended on the length of EDF II, in comparison to the conventional first and second type EDFAs. FIG. 6 illustrates the graphs of the power conversion efficiencies measured according to the variations in the length of EDF II for all four types of EDFAs.

According to the graphs as shown in FIG. 5 and FIG. 6, the highest small-signal gain and power conversion efficiency are observed in the third type EDFA when the length of EDF II is set to 35 m, whose values are respectively 21.83 dB and 21.1%. The tested values of the small-signal gain and the power conversion efficiency for the third type EDFA are respectively 4 dB and 11.5% higher than the first and the second type EDFAs under the same working condition.

Further, the fourth type EDFA performed better than the first and the second type EDFAs, as shown in FIG. 5 and FIG. 6. Thus, the result of test indicates that the amplifier efficiency is effectively improved when the pumping laser diode (32, 32') is arranged between the first and the second EDF regions, but provided after the second EDF region (EDF II) according to the front pumping (FIG. 3), or before the EDF region (EDF II) according to the back pumping (FIG. 4).

The improvement in the power efficiency is attributed by amplified spontaneous emission (ASE) that is generated in EDF I and propagated in the opposite direction to the pumped light, reused as the pumping light source in the EDF region (not being pumped) with wavelength of 1550 nm to generate photons in a band of 1600 nm. That is, a small fraction of the erbium atoms spontaneously drop from the excited state, releasing their extra energy as light in the form of spontaneous emission. When this is directed along the fiber, it is amplified, generating ASE.

Figure 7:
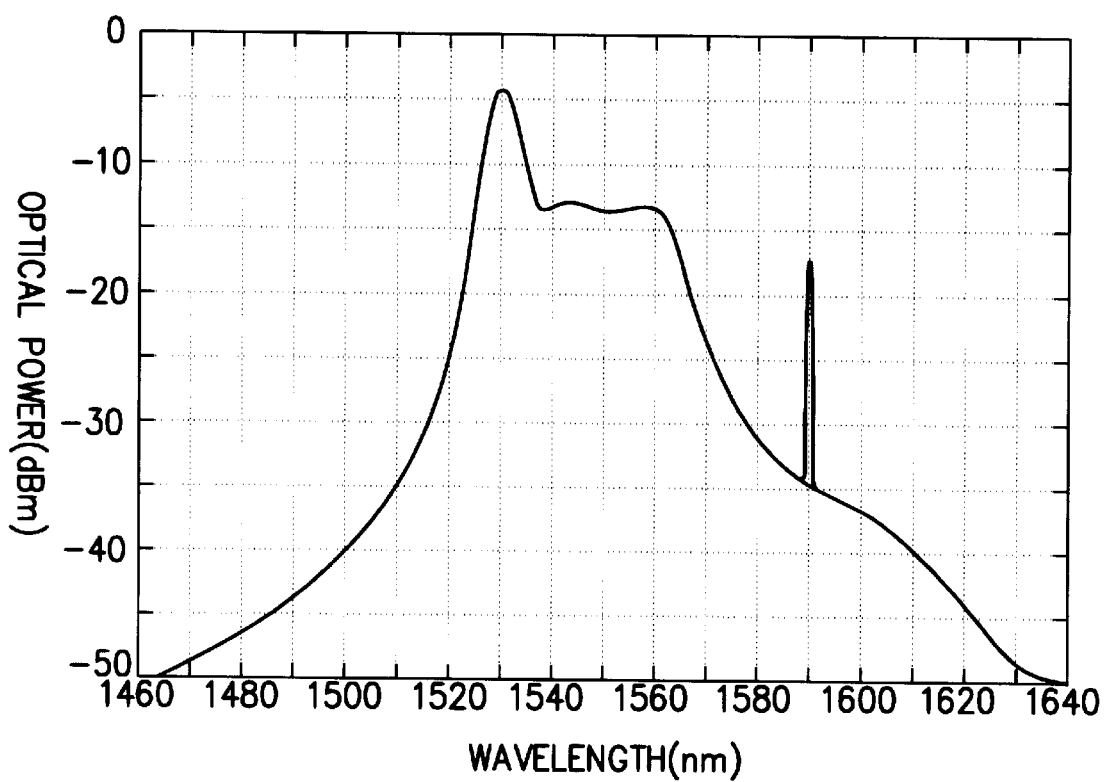
FIG. 7 is a graph for illustrating measurement of the back ASE spectrum capable to enhance the power conversion efficiency according to the present invention; and, FIG. 8 is a graph for illustrating the noise figurees from the first through the fourth type of EDFAs measured according to the length variation in the second EDF (EDF II).

In order to prove the existence of back ASE, which improved the power conversion efficiency in accordance with the present invention, a circulator was used to measure for the back ASE spectrum in the first EDF region (EDF I). FIG. 7 shows the graph of the back ASE spectrum measured for the input signal of 0 dBm in the resolution band of 0.2 nm. In the graph, the peak near the wavelength at 1590 nm is caused by Rayleigh back-scattered portion of the input signal. The wavelength region representing the optical power not less than 25 dBm/0.2 nm, namely in the range of 1520 nm to 1565 nm, showed the strong back ASE of about 20.59 mW when integrated. When the EDFA was applied with a more weak input signal at −20 dBm/0.2 nm, a stronger back ASE was observed having about 28.9 mW, which represents approximating 30% of the whole pumped power. This ASE level is enough to amplify the L-band, which is supported by previous study and research of the L-band amplification having a weaker power and 1550 nm band signal.

Figure 8:
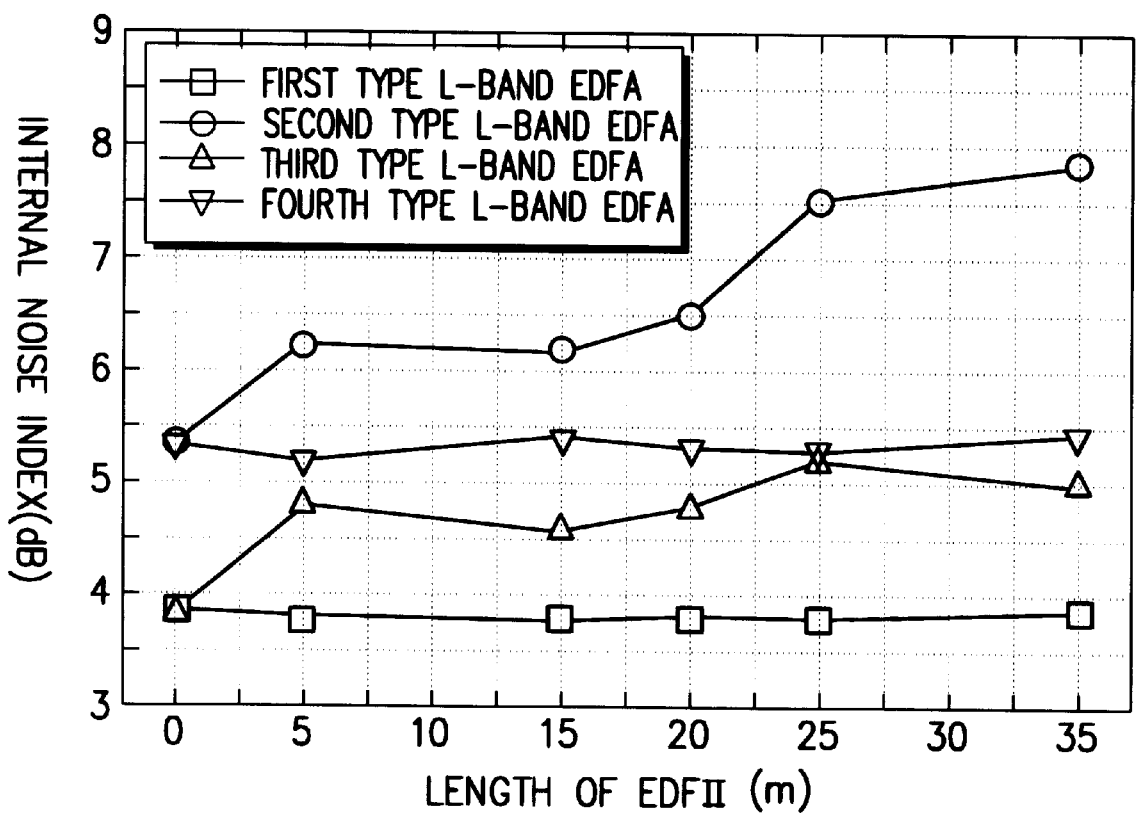

Further, the noise figure of the second region (EDFA II) in 1550 nm band is measured from the first through the fourth type EDFAs with the variations in the length of EDF II, as shown in FIG. 8. As expected, first and third EDFAs of the front pumping structure showed a better performance than the second and fourth EDFAs, and the second type EDFA has the highest noise figure among all EDFAs, which also increases rapidly with the increase in the length of EDF II. It is apparent that the second type EDFA is not suitable for the L-band EDFA.

The reason that the third type EDFA showed a worse characteristics than the first type EDFA as regards to the noise figure is attributed by the large pump emission cross section (in this case back ASE wavelength emission cross section) used for amplifying the wavelength of 1600 nm in the EDF region. Since the second EDF region (EDF II) for the fourth type EDFA is located at the output section of the amplifier, its influence on the noise figure is minimal compared to the second type EDFA because any element in the output section of the amplifier has negligible impact on noise figure.

As shown in the above experiments, the present invention provides the EDFA with enhanced power conversion efficiency that may be used for amplifying the optical signal in the wavelength region of 1570 nm to 1610 nm. In prior art, back amplification spontaneous emission (ASE) had be inhibited to obtain sufficient L-band signal gain since they cause saturation effects that compete with L-band photons. However, the invention utilizes the back ASE to serve as additional pumping light source for the EDF region, thus, improving the signal gain and pumping efficiency. Except for the loss of 1 dB regarding the noise figure, the test results showed the overall improvement in the power conversion efficiency from 9.6% to 21.1% and an increase in the small-signal gain as much as 4 dB, as shown in FIG. 5 and FIG. 6.

Furthermore, the performance was improved even when the wavelength of pumping device was changed from 980 nm to 1480 nm, with same proposed structure, which indicates that the present inventive EDFA structure can be applied for a wide range of pumping wavelength. In accordance with configuration of the present invention, the inventive feature of reusing the back ASE as an additional pumping source will not only improve the performance of the EDFA, but also help to develop an economical L-band EDFA, which uses the pumped power more efficiently.

While the present invention has been described with 'specific embodiments accompanied by the attached drawings, it will be appreciated by those skilled in the art that various changes and modifications may be made thereto without departing the gist of the present invention.

What is claimed is:

1. An optical fiber amplifier comprising:
    a first optical part and a second optical part, said second optical fiber part being connected with said first optical fiber part, said first optical fiber part being provided with a pumping light source directed away from said second optical fiber part and said second optical fiber part being not provided with a pumping light source, and
    a reuse means for utilizing backward amplified spontaneous emission (ASE) from said first optical fiber part generated in said first optical fiber part as a secondary pumping light source applied to said second optical fiber part.

2. An optical fiber amplifier as defined in claim 1, wherein said reuse means comprises a wavelength division multiplexed (WDM) coupler connected between said first and second optical fiber part, and a light pumping device connected with said WDM coupler to provide said pumping light source.

3. An optical fiber amplifier as defined in claim 1, wherein said first and second optical fiber parts each consist of erbium-doped optical fiber.

4. An optical amplifier as defined in claim 3, wherein said erbium-doped optical fiber is adjusted so as to produce a gain in the L-band.

5. An optical fiber amplifier, according to any preceding claim, further comprising:
    a pair of optical isolator respectively provided at the front and back ends of said optical fiber amplifier to guide the propagation of a signal light in a single direction.

6. A method for amplifying an optical signal comprising the steps of:
    providing an optical fiber amplifier having a first optical fiber part, a second optical fiber part, and a pumping light source provided therebetween, to provide pumping light to said first optical fiber part only;
    generating amplified spontaneous emission light in said first optical fiber part in the opposite direction to said pumping light;
    supplying said amplified spontaneous emission light from said first optical part to the second optical fiber part; and
    using said supplied amplified spontaneous emission light as a pumping source in said second optical fiber part.

7. A method according to claim 6 further comprising the steps of:
    providing an input signal light to the input of said optical fiber amplifier, and
    providing an output signal light from an output of said optical fiber amplifier.

8. A method of improving power conversion efficiency of an optical fiber amplifier used in an optical communication system of the type having a first optical fiber provided with a pumping light source and a second optical fiber, wherein a pumping device is disposed between said first optical fiber and said second optical fiber, said method comprising the steps of:
    providing a pump light source between said first optical fiber and said second optical fiber;
    inputting a plurality of optical communication signals having a respective wavelength within a range of about 1570 nm to 1610 nm to said amplifier; and
    pumping said first optical fiber at said respective wavelength to provide a high power efficiency by utilizing amplified spontaneous emission (ASE) from said first optical fiber as a secondary pumping light source to said second optical fiber.

9. A method in accordance with claim 8, wherein said amplifier is an erbium-doped fiber amplifier.

* * * * *